US005493309A

United States Patent [19]
Bjornholt

[11] Patent Number: 5,493,309
[45] Date of Patent: Feb. 20, 1996

[54] COLLISON AVOIDANCE COMMUNICATION SYSTEM AND METHOD

[75] Inventor: John E. Bjornholt, Mesa, Ariz.

[73] Assignee: Motorola, Inc., Schaumburg, Ill.

[21] Appl. No.: 125,891

[22] Filed: Sep. 24, 1993

[51] Int. Cl.⁶ .................................................. G01S 3/02
[52] U.S. Cl. .......................... 342/455; 342/29; 364/461
[58] Field of Search ............................ 342/455, 456, 342/29, 30, 32, 43, 44, 45, 453; 364/461

[56] References Cited

U.S. PATENT DOCUMENTS

| | | | |
|---|---|---|---|
| 3,573,823 | 4/1971 | French | 342/43 |
| 3,750,166 | 7/1973 | Dearth | 343/6 TV |
| 3,766,552 | 10/1973 | Hajkuk | 343/6 R |
| 3,801,979 | 4/1974 | Chisholm | 343/6.5 LC |
| 4,293,857 | 10/1981 | Baldwin | 343/6.5 R |
| 4,380,050 | 4/1983 | Tanner | 364/461 |
| 4,454,510 | 6/1984 | Crow | 343/5 GC |
| 4,782,450 | 11/1988 | Flax | 364/461 |
| 4,835,537 | 5/1989 | Manion | 342/30 |
| 5,111,400 | 5/1992 | Yoder | 364/424.01 |

Primary Examiner—Thomas H. Tarcza
Assistant Examiner—Dao L. Phan
Attorney, Agent, or Firm—Frederick M. Fliegel

[57] ABSTRACT

In a collision avoidance communication system and method, equipped aircraft (12) and ground control stations (18) which represent nodes of an RF communication network (22). A radar system (16) determines locations of equipped aircraft (12) and unequipped aircraft (14) within an airspace (10). The ground control station (18) couples to the radar system (16) and the network (22) to receive location data for the aircraft (12, 14). These location data are merged in an object list (142). The ground control station (18) displays objects from the object list (142), broadcasts surrogate location data (84) for unequipped aircraft (14) over the network (22), and broadcasts control data (100, 116) describing weather conditions, geographic features, and the like, over the network (22). Equipped aircraft 12 receive aircraft location data (84) and control data (100, 116) from the network (22). Each equipped aircraft (12) determines its own location. The equipped aircraft (12) include a display (62) which shows the locations and orientations of nearby aircraft (12, 14) and of geographic features, and the equipped aircraft (12) broadcast their own locations over the network (22).

29 Claims, 14 Drawing Sheets

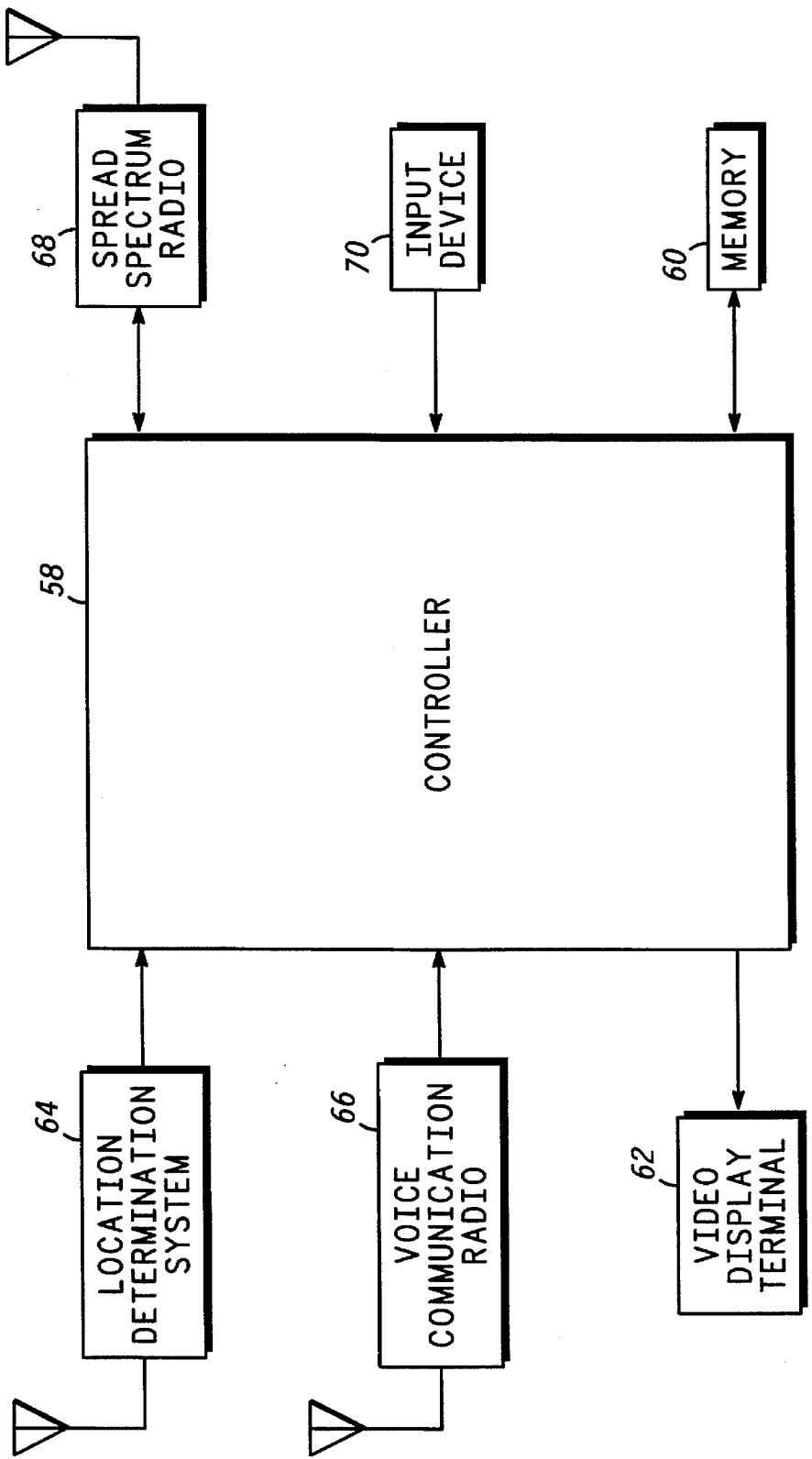

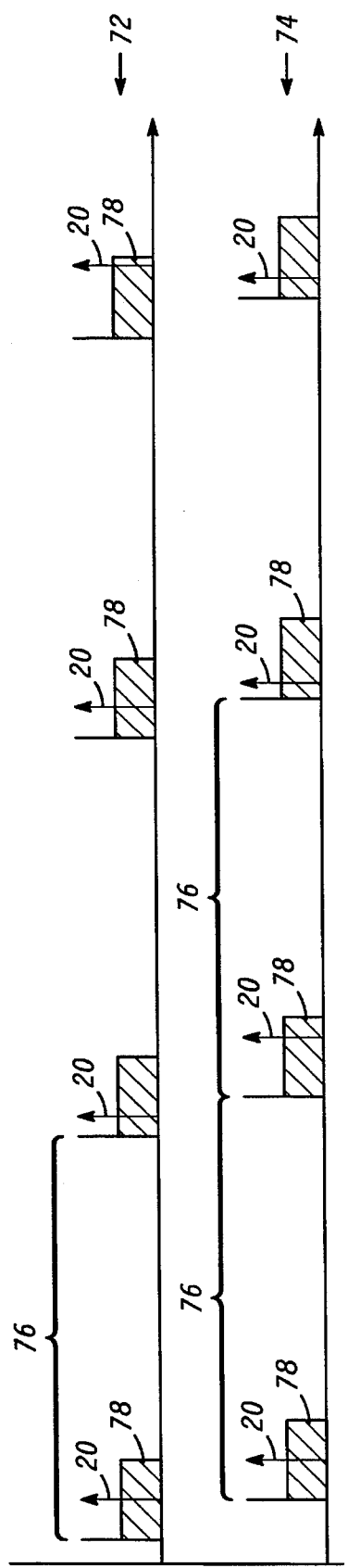

| 80 | 82 | 102 | 104 | 106 | 108 | 110 | 112 | 114 |
|---|---|---|---|---|---|---|---|---|
| SYNC. | FRAME TYPE | AIRPORT CODE | BAROMETER | WIND SPEED | WIND DIRECTION | TEMPERATURE | APPROACH FREQUENCY | TOWER FREQUENCY |

| 80 | 82 | 118 | 120 | 122 | 124 | 126 | 128 |
|---|---|---|---|---|---|---|---|
| SYNC. | FRAME TYPE | FEATURE CODE | LATITUDE | LONGITUDE | ALTITUDE | GPS DIFFERENTIAL CORRECTION | OTHER CONTROL DATA |

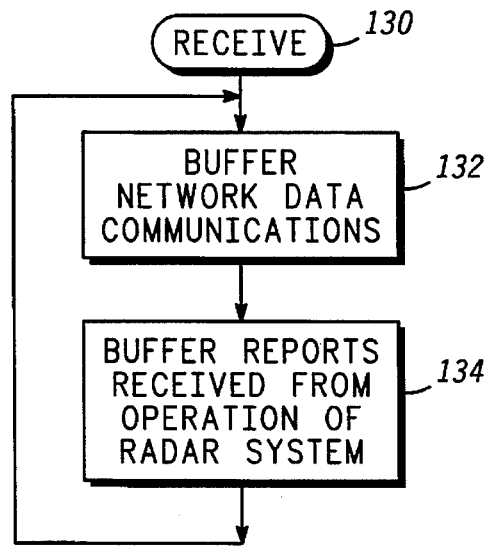
FIG. 8
FIG. 9
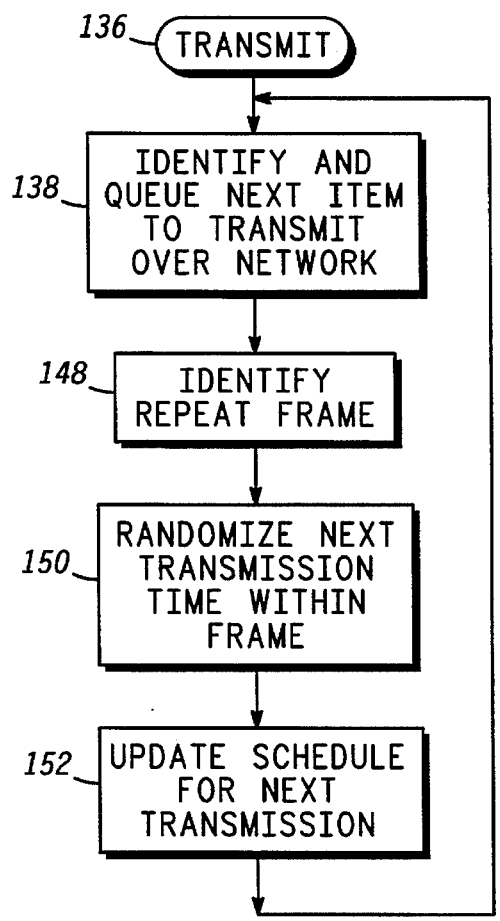

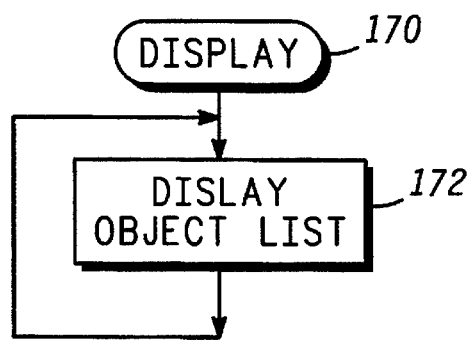
*FIG. 11*
*FIG. 12*
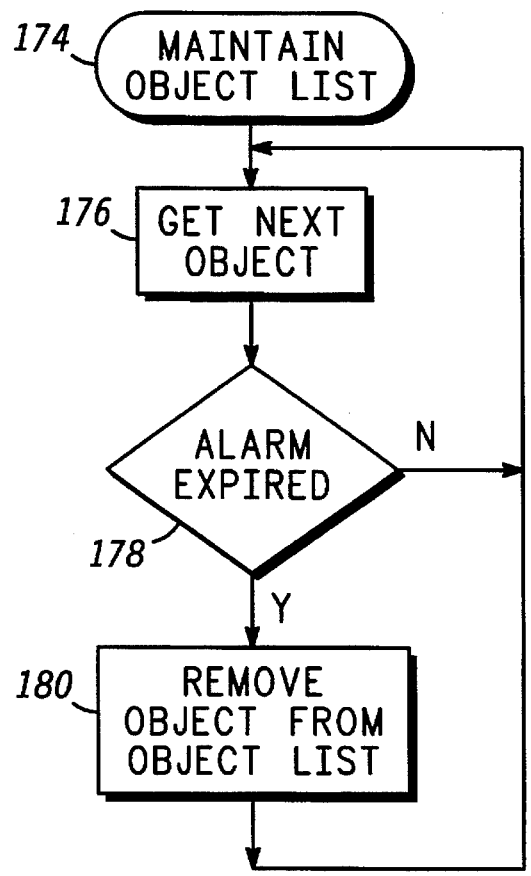

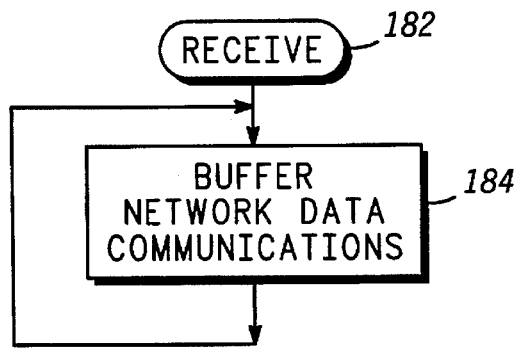
FIG. 14
FIG. 15
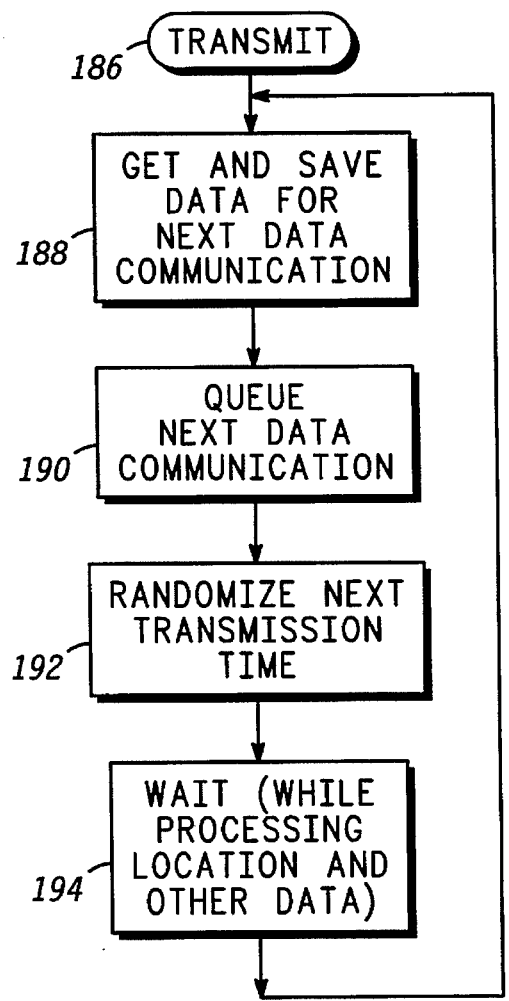

COLLISON AVOIDANCE COMMUNICATION SYSTEM AND METHOD

TECHNICAL FIELD OF THE INVENTION

The present invention relates generally to avionics. More specifically, the present invention relates to communication and other systems which function to facilitate aircraft collision avoidance, navigation and communications.

BACKGROUND OF THE INVENTION

Few pilots simply operate their aircraft. In addition to causing aircraft to operate as desired from instant to instant, pilots deal with numerous avionic systems. Through these systems pilots gain intelligence letting them know what to do to travel safely from point A to point B and to avoid collisions. Voice communication radios, navigation systems, compasses, altimeters and the like represent a few of such avionic systems.

In accordance with current practices, collision avoidance functions take place primarily over radios through voice communications with air traffic controllers. In a crowded airspace, a virtually continuous stream of conversations with air traffic controllers manages collision avoidance for the aircraft in the airspace. The air traffic controllers base their communications upon information generated by a massive infrastructure of collision avoidance systems. The collision avoidance infrastructure includes radar systems and a population of aircraft-mounted transponders.

The number and diversity of these aviation-related systems provides a complicated aircraft cockpit environment. Pilots digest vast amounts of visual and audible data, much of which is distracting and has little or no direct bearing upon pilots' immediate informational needs. Often times, verbal communications are misunderstood. At best, when verbal instructions are misunderstood from a radio they are repeated, which throws even more audible information at all pilots tuned to that frequency. In the worst cast, when verbal instructions are misunderstood pilots may err in following the instructions, leading to seriously unsafe conditions. The flood of verbal and visual information available to pilots and the complication of avionic systems leads to pilot fatigue, pilot error and generally unsafe aircraft operating conditions.

Industry experts have long recognized that additional or different types of aviation systems might improve airspace safety, and many alternate systems have been proposed. One desirable alternate solution to collision avoidance gives pilots visual information, such as on a video display terminal, describing the location of nearby aircraft. Pilots are ultimately responsible for the safe operation of their aircraft. This alternate collision avoidance system is desirable because it allows pilots to share with traffic controllers in making decisions regarding collision avoidance. Moreover, this solution lessens the workload and responsibilities placed on air traffic controllers.

While desirable in theory, the conventional proposals for this type of collision avoidance solution have two serious drawbacks. First, they typically place yet another avionic system in the cockpit to further burden pilots with data. Thus, these conventional proposals advocate the use of systems which typically complicate rather than simplify the cockpit. Second, these types of collision avoidance systems often require substantially all aircraft to be equipped with the system before a significant safety benefit may result. Often times, proposed alternate collision avoidance systems generate particularly unsafe conditions when nearby aircraft are not equipped with the alternate system.

This second problem is an extremely serious drawback. A massive infrastructure of radio systems, transponder systems, radar systems, navigation systems and the like currently exists in a vast number of aircraft, airports and other control facilities. Alternate avionic infrastructures cannot be brought instantly "on-line." In other words, the entire aviation industry cannot simply and instantly overcome the massive cost, installation, testing and troubleshooting problems posed by an alternate system's infrastructure. Consequently, alternate systems must co-exist with old systems, perhaps for a considerable period of time. When comparing existing and alternate systems, the existing systems are useful because the required infrastructure is already in place, and the results are still tolerable, albeit far less than desirable. The massive costs of an alternate infrastructure coupled with a lack of benefit, and even possible harm, until substantially all aircraft and facilities are equipped with the systems that link them in the alternate infrastructure and the additional cockpit complication imposed by an alternate system cause such alternate systems to be un-implementable for all practical purposes.

SUMMARY OF THE INVENTION

Accordingly, it is an advantage of the present invention that an improved collision avoidance and communication system is provided along with an improved method for communicating and for avoiding collisions.

Another advantage of the present invention is that an integrated system is provided which simplifies rather than complicates the cockpit and aircraft operations such as communication, navigation and collision avoidance.

Yet another advantage is that the present invention provides a collision avoidance system which gives pilots information regarding locations of nearby aircraft.

Yet another advantage is that the present invention provides a collision avoidance system which may be implemented gradually throughout the aviation industry.

Yet another advantage is that the present invention provides a collision avoidance system which instantly benefits "equipped" aircraft even though a substantial portion of the population of aircraft is not equipped.

The above and other advantages of the present invention are carried out in one form by a system having a plurality of aircraft at various locations and having a control station. The present invention may by carried out by a method of managing information useful for safely operating the aircraft. The method calls for obtaining, at a first aircraft, first data describing locations of an equipped set of nearby aircraft. The first data are obtained from the equipped set of nearby aircraft. Second data are obtained at the first aircraft. The second data describe locations of an unequipped set of nearby aircraft. The second data are obtained from the control station. The first and second location data are displayed at the first aircraft.

BRIEF DESCRIPTION OF THE DRAWINGS

A more complete understanding of the present invention may be derived by referring to the detailed description and claims when considered in connection with the Figures, wherein like reference characters refer to similar items throughout the Figures, and:

FIG. 3 shows a block diagram of an exemplary aircraft station used in connection with the present invention;

FIG. 4 shows a timing diagram that depicts transmissions from two sources of location data;

FIG. 5 shows a block diagram of an exemplary format used in conveying a first type of data communication;

FIG. 6 shows a block diagram of an exemplary format used in conveying a second type of data communication;

FIG. 7 is a block diagram of an exemplary format used in conveying a third type of data communication;

FIG. 8 is a flow chart of exemplary processes performed at a ground control station;

FIG. 9 is a flow chart of a transmit process;

FIG. 11 is a flow chart of a display process;

FIG. 12 is a flow chart of a maintain object list process;

FIG. 14 is a flow chart of exemplary processes performed at an aircraft station;

FIG. 15 is a flow chart of a transmit process;

DETAILED DESCRIPTION OF THE DRAWINGS

Figure 1:
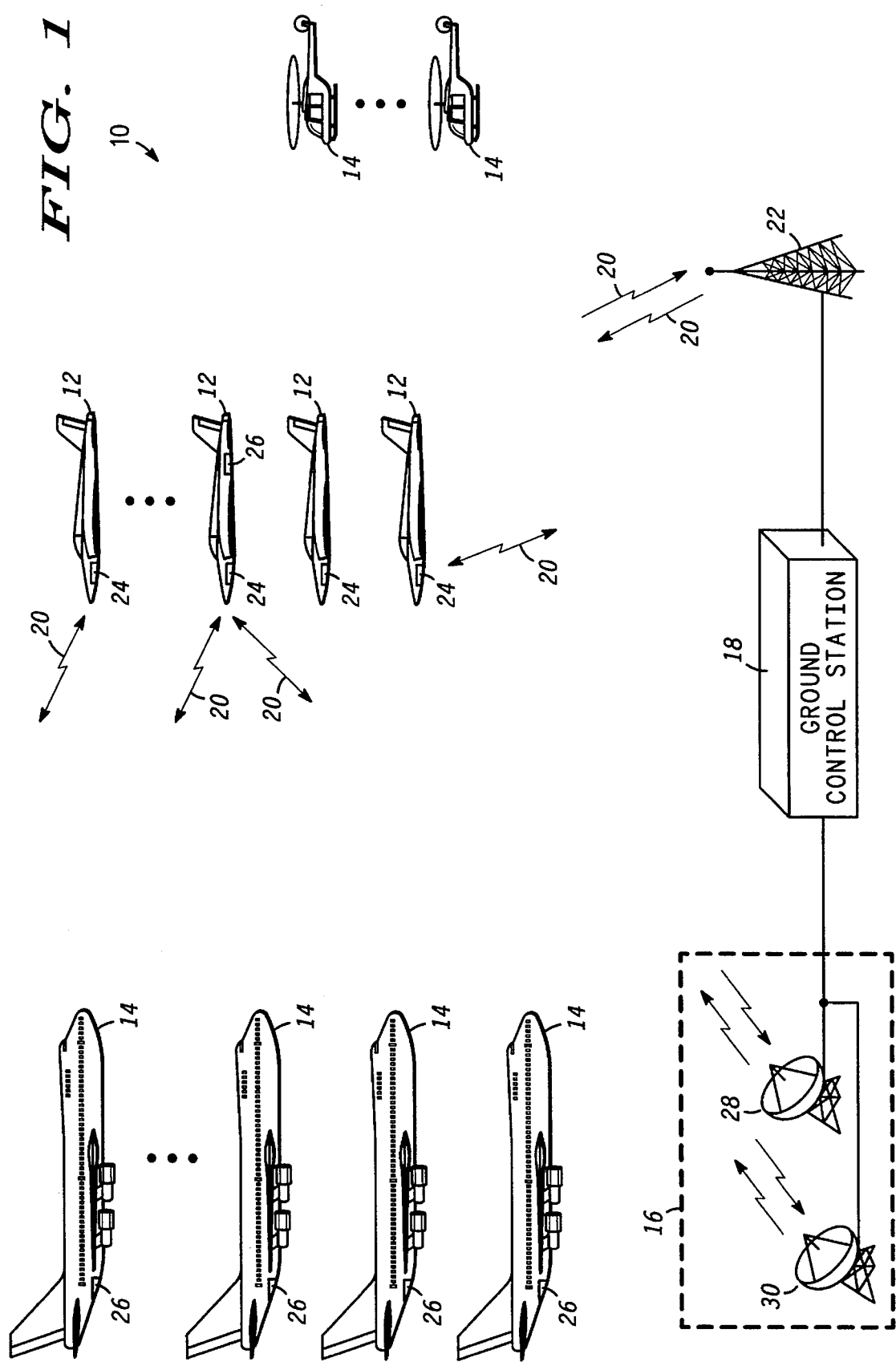
FIG. 1 shows a diagram of the environment in which the present invention operates.

FIG. 1 shows a diagram of the environment in which the system and method of the present invention operate. As depicted in FIG. 1, airspace 10 includes a population of aircraft which includes equipped set of aircraft 12 and unequipped set of aircraft 14. The system and method of the present invention facilitate safe operation of aircraft 12, 14 within airspace 10, regardless of relative populations of equipped aircraft 12 and unequipped aircraft 14. Equipped aircraft 12 benefit from convenience in operating aircraft 12 and improved safety regardless of the number of unequipped aircraft 14 that may be present in airspace 10 at any given time. Unequipped aircraft 14 benefit because information concerning their locations is distributed to a number of pilots in addition to air traffic controllers.

Any number of airspaces 10 may exist with respect to a geographic area and airspaces 10 may overlap. Radar system 16 detects the presence of aircraft 12, 14 in airspace 10. Radar system 16 couples to ground control station 18. Data communications 20 are sent back and forth among equipped aircraft 12 and between equipped aircraft 12 and ground control station 18 over RF communication network 22.

Any number of equipped aircraft 12 may reside in any given airspace 10 at any instant in time. Equipped aircraft 12 differ from unequipped aircraft 14 because each equipped aircraft 12 carries aircraft station 24. Nothing prevents equipped aircraft 12 from also carrying other well known avionic equipment. In particular, equipped aircraft 12 may, but need not, carry conventional transponder 26. Any number of unequipped aircraft 14 may reside in the same airspace 10 where equipped aircraft 12 reside. Unequipped aircraft 14 do not carry functional aircraft stations 24. In other words, either aircraft station 24 has not been installed in unequipped aircraft 14 or a previously installed aircraft station 24 is not functioning properly. As is the current practice, a vast number of unequipped aircraft 14 include conventional transponders 26, but some of unequipped aircraft 14 do not even carry transponders 26.

For convenience, FIG. 1 illustrates equipped aircraft 12 as being grouped together and unequipped aircraft 14 as being grouped together. However, those skilled in the art will appreciate that no particular relative grouping, spacing or orientation is required or implied by the present invention. Rather, any one of aircraft 12, 14 may reside at any point and take any heading within airspace 10 for the purposes of the present invention.

Radar system 16 represents any of the conventional radar systems currently installed at numerous airports and other locations and currently used in connection with conventional air traffic control to achieve collision avoidance. Thus, radar system 16 includes primary radar system 28 coupled to secondary radar system 30. Primary system 28 desirably detects locations of aircraft 12, 14 through transponders 26. Location data obtained from primary radar 28 identify an aircraft's direction from primary radar 28 and an aircraft's distance from primary radar 28. Secondary radar system 30 employs skin tracking, assuming detected aircraft present a sufficient radar cross section to improve upon obtainable location data.

Secondary system 30 operates successfully regardless of particular radar cross sections presented to primary radar 28. In "mode A" operation, transponders 26 provide data identifying an aircraft's identification (ID) number. In "mode C" operation, transponders 26 provide altitude data. In "mode S" operation, transponders 26 provide even more sophisticated location data. Of course, aircraft 12, 14 must carry transponder 26 in order for transponder 26 to provide any data to secondary system 30. Different versions of transponders 26 may operate in different modes.

Although not shown in FIG. 1, radar system 16 also includes a sophisticated processing system that distinguishes aircraft 12, 14 from other objects and that merges primary and secondary radar system location data while distinguishing detected objects from one another. Radar system 16 further includes a display system (not shown) that graphically depicts the objects, such as aircraft 12, 14, detected through operation of radar system 16.

Communication network 22 operates over a common communication channel. In the preferred embodiment, network 22 operates by time multiplexing data communications 20 onto a single, common frequency band to which ground control station 18 and all aircraft stations 24 remain tuned. In other words, ground control stations 18 and aircraft stations 24 are nodes of network 22. Desirably, all airspaces 10 utilize the same frequency so that stations 24 do not require re-tuning as equipped aircraft 12 move from one airspace 10 to another airspace 10. As discussed below in more detail, interference over this common communication channel is limited because each data communication 20 is a short duration burst. In addition, antenna configuration, in combination with transmission power, limit the radio communication range of data communications 20 among equipped aircraft 12 to a few miles. On the other hand, more efficient antenna configurations allow a much greater radio communication range for data communications 20 sent between equipped aircraft 12 and ground control station 18.

The radio communication range of equipped aircraft 12 is desirably kept as small as possible to minimize the chances of interference between data communications 20 on network 22. And, this radio communication range may be small because aircraft collision avoidance related data, such as locations of nearby aircraft, describing far off objects are of little value to an individual aircraft. On the other hand, ground control station 18 requires a greater range because, among other functions, it provides collision avoidance services for all aircraft 12, 14 in airspace 10, whether near to or far from an antenna for ground control station 18. Since a much smaller number of ground control stations 18 are expected to operate on network 22 than the number of equipped aircraft 12, little increase in likelihood of interference between data communications 20 results from the relatively long communication range for ground control stations 18.

Figure 2:
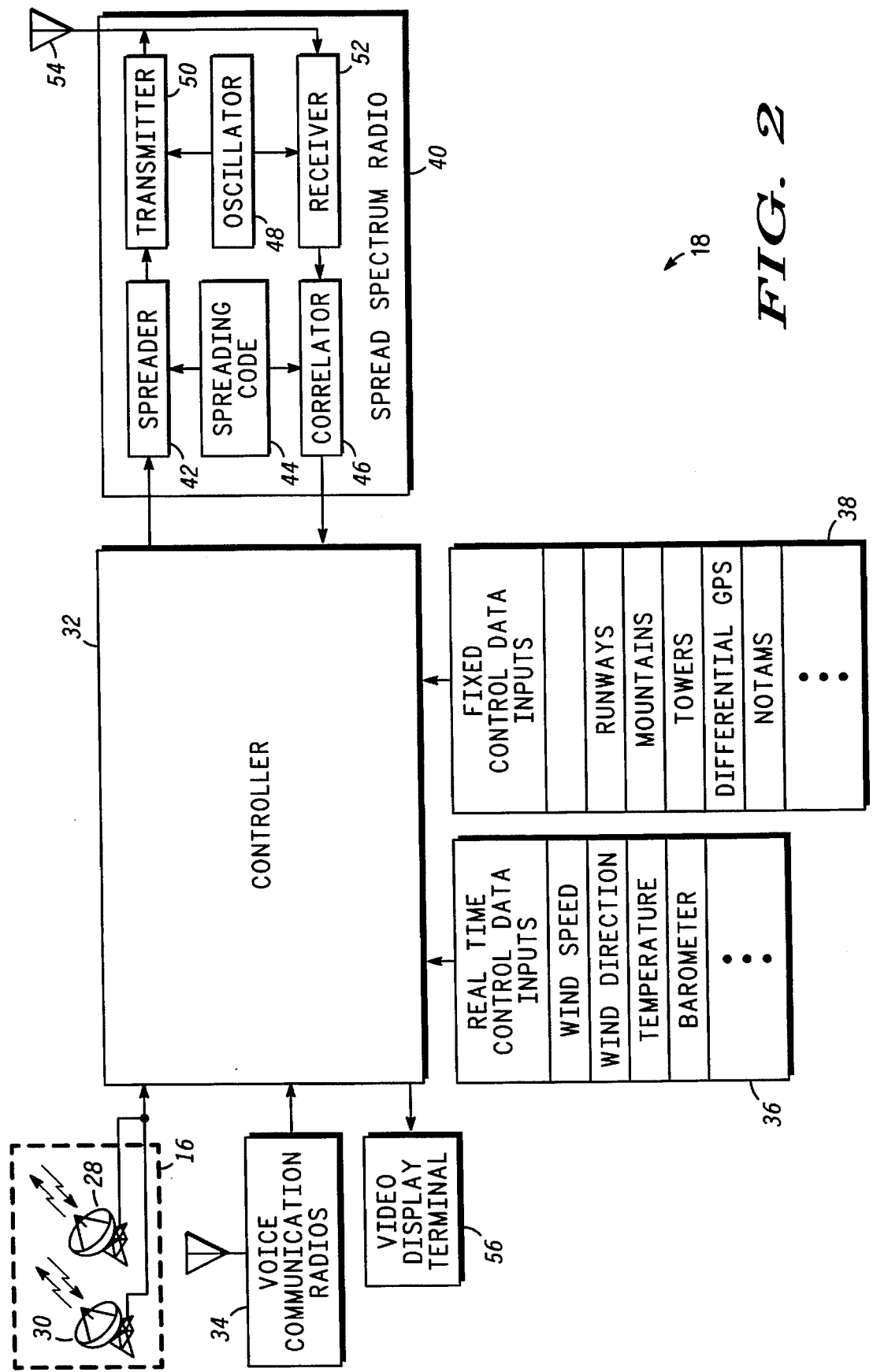
FIG. 2 shows a block diagram of an exemplary control station used in connection with the present invention.

FIG. 2 is a block diagram of an exemplary ground control station 18 used in connection with the present invention. As shown in FIG. 2, ground control station 18 includes controller 32. Controller 32 includes one or more conventional computer systems. As is conventional for computer systems, controller 32 includes one or more processors, memory, timers, input devices, output devices and the like (not shown). The memory of controller 32 stores programs which, when executed, cause ground control station 18 to carry out processes (discussed infra, e.g., FIGS. 8–12). In addition, the memory includes variables, tables, databases and other memory structures that are manipulated due to the operation of ground control station 18. The timer (not shown) of controller 32 allows ground control station 18 to act in accordance with particular timing considerations that are discussed below.

Controller 32 has numerous inputs receiving data from, and outputs supplying data to, other devices. Radar system 16 couples to a data input for controller 32. Data received from radar system 16 preferably describes objects and data displayed on conventional air traffic control terminals. In other words, controller 32 receives location data from radar system 16. As a minimum, location data identify X-Y coordinates for a detected object, such as aircraft 12, 14. These X-Y data may correspond to data obtained only through primary radar 28. When location data refer to aircraft 12, 14 equipped with transponder(s) 26, they also include aircraft ID and possibly altitude data.

An optional input of controller 32 couples to voice communication radios 34 used at the facility where ground control station 18 is used, such as an airport or air traffic control facility. This input provides controller 32 with data identifying the voice channels being used by the facility for radio communication with aircraft 12, 14. When this input is omitted, data identifying radio voice communication channels may be entered using other conventional computer data entry techniques (e.g., manual entry via keyboard).

Another data input of controller 32 couples to a device or devices providing real time control data, such as an automated weather station 36. Control data represent any data, other than data describing aircraft locations, useful to control of equipped aircraft 12. Real time control data represent time varying control data. In particular, this real time control data may describe weather conditions, perhaps at an airport where ground control station 18 is installed. Weather conditions useful to aircraft operation include wind shear, wind speed, wind direction, temperature and barometer readings.

Real time control data may also include differential GPS data. As discussed in more detail below, equipped aircraft 14 include a location determination system, such as a Global Positioning System (GPS) receiver. As is well known to those skilled in the art, differential GPS data allows for improved accuracy over that otherwise obtainable through a GPS receiver. In accordance with the present invention, differential GPS data may, for example, provide correction data which help on-board GPS receivers accurately identify their locations as they approach a runway.

Another data input of controller 32 couples to a device, such as a memory device 38, which provides fixed control data inputs, i.e., data which do not significantly vary over time. Thus, such data may be loaded in memory device 38 using conventional data entry techniques and updated from time to time as needed. Those skilled in the art will appreciate that memory 38 may actually represent a portion of controller 32 rather than a separate device.

Fixed control data may, for example, describe particular nearby geographic features. Examples of geographic features include runways which have particular locations, altitudes and orientations, mountain peaks and antenna towers which have particular locations and altitudes and the like. In addition, fixed control data may include Notices to Airmen (NOTAMs) which are published from time to time to provide useful information to pilots operating aircraft in particular areas.

Another data input of controller 32 couples to a spread spectrum radio 40. Radio 40 allows ground control station 18 to communicate over network 22 (FIG. 1). This data input receives data communications 20 via antenna 54, which are broadcast by any source of location data, such as equipped aircraft 12 or possibly other ground control stations 18, on network 22. Controller 32 also couples to radio 40 via a serial output and a serial input.

Radio 40 includes spreader 42 which has an input coupled to the serial data output from controller 32. Spreader 42 has another data input which receives a spreading code from spreading code block 44. A correlator 46 also receives a spreading code from spreading code block 44, and correlator 46 provides a data output which couples to the serial data input of controller 32. An oscillator 48 couples to both a transmitter 50 and a receiver 52. Transmitter 50 receives a signal from an output of spreader 42 and modulates the signal for radiation from radio 40 through an antenna 54. Electromagnetic signals received at antenna 54 are passed to receiver 52. An output of receiver 52 couples to an input of correlator 46. Receiver 52 down-converts the signals received at antenna 54 to baseband, and passes the baseband signals to correlator 46.

Spreader 42 spreads data communication 20 received from controller 32 over a broad frequency spectrum relative to a maximum data rate at which data communication 20 is supplied to radio 40 from controller 32. By spreading the RF energy associated with data communication 20 over a relatively broad frequency spectrum, the data communication's immunity to multipath and other forms of interference improves. Correlator 46 performs a complementary function to spreader 42. Correlator 46 correlates a received signal using the spreading code to determine whether incoming data communication 20 has been detected by radio 40.

Spreader 42 usefully frequency spreads data communication 20 such that data communication 20 occupies a bandwidth of several to many times the bandwidth normally associated with the data rate. Spread spectrum communications may occupy bandwidths of 25% or more of the nominal carrier frequency at which radio 40 transmits and receives data. Smaller bandwidths (e.g., 1%, 2% . . . 5%, 10% ... 20% or more or less) are also desirably employed in many applications.

Another output of controller 32 couples to video display terminal 56. Video display terminal 56 may resemble a conventional video terminal of the type used in aircraft traffic control or any other type of video display terminal known to those skilled in the art. Controller 32 displays location data for aircraft 12, 14 and other data on video display terminal 56. Controller 32 controls the images shown or otherwise displayed on video terminal 56 in a conventional manner.

FIG. 3 shows a block diagram of exemplary aircraft station 24 (FIG. 1) used in connection with the present invention. Preferably, all equipped aircraft 12 include aircraft stations 24 compatible with that shown in FIG. 3. However, nothing prevents various aircraft stations 24 from including fewer features than those described below for aircraft station 24.

As shown in FIG. 3, aircraft station 24 includes a controller 58. Controller 58 includes one or more conventional computer systems. As is conventional for computer systems, controller 58 includes one or more processors, timers, input devices, output devices and the like. The timer (not shown) of controller 58 allows aircraft station 24 to act in accordance with particular timing considerations discussed infra (e.g., FIG. 4 and associated text).

Memory 60 couples to controller 58 and stores programs which, when executed, cause aircraft station 24 to carry out processes that are discussed below. In addition, memory 60 includes variables, tables, databases and other memory structures that are manipulated due to the operation of aircraft station 24. Memory 60 also stores data controlling images viewed on video display terminal 62 (coupled to a data output of controller 58).

Controller 58 has other inputs receiving data from other devices and outputs supplying data to other devices. For example, location determination system 64 couples to one of the data inputs. The above-discussed GPS receiver preferably serves as location determination system 64 in the preferred embodiment of the present invention, but other location systems known to those skilled in the art may be adapted for use in connection with the present invention. Location determination system 64 provides data to controller 58 which describe a current location for an equipped aircraft 12 within which station 24 resides.

Another input of controller 58 couples to a voice communication radio 66 which is also located in equipped aircraft 12. Voice communication radio 66 represents a conventional radio of the type used by pilots in verbally communicating with airport control towers, air traffic control facilities, and the like. This input provides controller 58 with data identifying the voice channels currently being used by radio 66.

Another data port, which supports both input and output data, of controller 58 couples to a spread spectrum radio 68. Spread spectrum radio 68 resides in equipped aircraft 12 and is desirably configured approximately as described above in connection with spread spectrum radio 40 (FIG. 2). In fact, spread spectrum radio 68 for each equipped aircraft 12 is desirably compatible with radios 40 located in ground control stations 18 (FIGS. 1–2). In other words, data communications 20 transmitted from any spread spectrum radio 40 or 68 may be detected by any other spread spectrum radio 40 or 68 within range.

Another data input of controller 58 couples to input device 70, usefully a switch or a pointing device of the type conventionally used in connection with video display terminals. Input device 70 allows a pilot of equipped aircraft 12 to issue instructions to aircraft station 24. Such instructions may, for example, instruct aircraft station 24 to display a particular one of several different types of screen images at video display terminal 62.

Generally speaking, aircraft stations 24 carried by equipped aircraft 12 repetitively transmit their own locations over network 22, and ground control station 18 repetitively transmits the locations of unequipped aircraft 14 over network 22. Equipped aircraft 12 receive location data transmissions from sources of location data within radio range and display this location data for use by the pilots of equipped aircraft 12.

As discussed above, each data communication 20 (FIG. 1) takes place for only a brief duration to reduce the likelihood of interference between data communications 20 transmitted over network 22 from different sources.

FIG. 4 shows a diagram depicting timing for data communications 20 from any two stations 72, 74 that transmit location data for a particular aircraft 12, 14, whether such stations 72, 74 are ground control stations 18 or aircraft stations 24 (FIG. 1). Each station 72, 74 divides time upon network 22 into frames 76. For any given station 72, 74, frames 76 are preferably of relatively consistent duration from frame to frame. However, nothing requires all aircraft stations 24 and/or ground control stations 18 to have the same duration of frames 76. Desirably, each station 72, 74 operates asynchronously to other stations 72, 74. In other words, their frames 76 need not, except by rare coincidence, begin at the same points in time.

In the preferred embodiments, each source of location data, such as stations 72, 74, broadcasts location data every frame. One data communication 20 conveys location data for one aircraft 12, 14. For aircraft stations 24, these location data describe the current location of the corresponding equipped aircraft 12, and one location data communication 20 is broadcast per frame. For ground control stations 18, this one location data communication 20 is broadcast every frame 76 for each unequipped aircraft 14 in airspace 10 (FIG. 1).

Since frames 76 of stations 72, 74 are asynchronous, the chances of any two data communications 20 being broadcast at the same time are remote. However, stations 72, 74 desirably randomize the precise transmission time within timing window 78. In other words, the chances of broadcasting data communication 20 at any point within timing window 78 are approximately the same as the chances of broadcasting data communication 20 at any other point within timing window 78. The point within window 78 at which data communication 20 is broadcast most likely changes from one frame 76 to another frame 76. Accordingly, even if two stations 72, 74 happen to broadcast data communications 20 at the same time in any one frame 76, the chances of the interference being avoided in the next few frames are extremely high.

By way of example, and not to be considered limiting, frames 76 may be approximately 1 second long for both aircraft stations 24 and ground control stations 18. A 128 bit data communication 20 may be transmitted in approximately 90 microseconds in an approximately 50 MHz spread spectrum frequency band. This produces a duty cycle of approximately 0.01% of frame 76 for each data communication 20. If airspace 10 (FIG. 1) includes approximately 1000 equipped and unequipped aircraft 12, 14, which is a very large number of active aircraft, then the chances of interference in any one frame would be around 10%. However, randomization of broadcasts between frames 76 virtually ensures that over the course of a few frames 76, one or another data communication 20 will be reliably received by other equipped aircraft 12 and ground control stations 18 within radio range.

FIGS. 5–7 show block diagrams of exemplary formats used in conveying various data communications 20. All data communications 20 may include data field 80 for synchronization and data field 82 to convey a code identifying the type of data communication 20 being communicated.

FIG. 5 shows an exemplary data format used to convey location data communication 84, representing a data communication 20 conveying location data. Equipped aircraft 12 may broadcast location data communications 84 to inform other equipped aircraft 12 and ground control stations 18 within radio range of its current location. Ground control stations 18 may broadcast surrogate location data communications 84 to inform equipped aircraft 12 of the current locations of unequipped aircraft 14.

Location data communication 84 may include data field 86 carrying identification of aircraft 12, 14 whose location the location data communication 84 describes. Altitude field 87 describes the aircraft's altitude, and latitude and longitude fields 88 and 90, respectively, describe X-Y coordinates for the aircraft. Data fields 92 and 94 may convey data describing the aircraft's heading and ground speed, respectively. Data fields 96 and 98 may convey data identifying the particular communication channels being used by voice communication radios 66 (FIG. 3) co-located with an aircraft station 24.

Of course, not all the data capable of being conveyed by location data communication 84 need be included in each communication 84. For example, when a ground control station 18 sends a surrogate location data communication 84, voice communication channels, altitude and aircraft identification may be unknown. In these and similar situations, appropriate dummy values may be substituted.

FIG. 6 shows an exemplary data format used to convey first control data communication 100. Control data communication 100 represents data communication 20 conveying control data, such as that discussed above in connection with FIG. 2. Ground control station 18 may broadcast control data communications 100 to inform equipped aircraft 12 within radio range of control data related to some facility, such as an airport.

Control data communication 100 may include data field 102 carrying the code or identification of the airport or other facility to which communication 100 relates. Data fields 104, 106, 108, 110 may carry data describing weather conditions at this facility. The weather conditions may, for example, be communicated by quantifying current barometer readings, wind speed, wind direction and temperature. Data fields 112, 114 may convey data identifying voice communication channels currently being used by the facility. These communication channels may, for example, identify an approach frequency and a tower frequency.

FIG. 7 shows an exemplary data format used to convey a second control data communication 116. Control data communication 116 represents another example of data communication 20 conveying control data. Ground control station 18 may broadcast control data communications 116 to inform equipped aircraft 12 within radio range of control data related to nearby geographic features. Airport runways, mountain peaks, towers, and tall buildings represent some of the geographic features of interest to pilots in navigating and in avoiding collisions.

Control data communication 116 may include data field 118 which identifies the type of feature being described. For example, an airport runway may be described as a different type of geographic feature than a tower. Data fields 120, 122, 124 may convey data describing latitude, longitude and altitude of the geographic feature. Data field 126 may convey the above-discussed differential GPS correction data, and other data fields 128 may convey any other data of interest in describing the geographic feature. For example, fields 128 may describe runway orientation and length when the feature code identifies an airport runway.

In an alternate embodiment, memory 60 (FIG. 3) in aircraft stations 24 may include preprogrammed data describing the geographic features communicated by data communications 116. In this embodiment, data communications 116 may merely communicate changes to the preprogrammed data already stored at stations 24. This embodiment further reduces the data traffic on network 22.

As discussed above, location data communications 84 are broadcast at a rate of around one communication 84 per second for each aircraft 12, 14 in airspace 10. Control data communications 100, 116 are typically broadcast from ground control stations 18 at a lower frequency to minimize the data traffic on network 22. Control data communications 100 and 116 may, but need not, be broadcast at a lower frequency because the information they convey typically changes more slowly.

FIGS. 5–7 illustrate only a portion of the possible data communications 20 supported by the present invention. Other data communications 20 may convey NOTAMs from ground control stations 18 and control data, such as flight plan destination or aircraft status, from equipped aircraft 12. Still other data communications 20 may serve as commands to particular aircraft stations 24. Aircraft stations 24 may transmit other messages over network 22 in response to such commands. That way, aircraft stations 24 may function as transponders. Of course, the formats illustrated in FIGS. 5–7 are exemplary of the types of data formats supported by the present invention.

FIGS. 8–12 show flow charts of exemplary procedures performed by ground control station 18 (FIG. 1), wherein several different processes are performed concurrently and independently from one another to operate station 18 as described above. Each of these processes may operate in a continuous loop or in some other manner permitting them to remain indefinitely operative.

With reference to FIG. 8, receive process 130 performs task 132 to obtain data communication 20 from network 22. As soon as ground control station 18 (FIG. 1) receives data communication 20 through radio 40 (FIG. 2), task 132 places data communication 20 in a buffer in the memory of controller 32. Likewise, task 134 places a location record received from radar system 16 (FIGS. 1, 2) in this buffer of controller 32 as soon as it is received. The location records convey location data for equipped aircraft 12 and unequipped aircraft 14 in airspace 10. This location data may describe position, altitude if available, aircraft ID and the like, for aircraft 12, 14. Tasks 132 and 134 then repeat, either in a continuous loop as shown in FIG. 8 or as needed when additional data communications 20 and location data records are received.

FIG. 9 is a flow chart of transmit process 136, which controls the transmission of data communications 20 over network 22 from ground control station 18. Process 136 performs task 138 to examine a schedule and identify the next "item" to transmit from ground control station 18 and to queue this item for transmission. For the purposes of task 138, items represent data which are placed in data communication 20 for transmission over network 22. The items are included in a memory structure 140, a block diagram of which is shown in FIG. 13.

Figure 13:
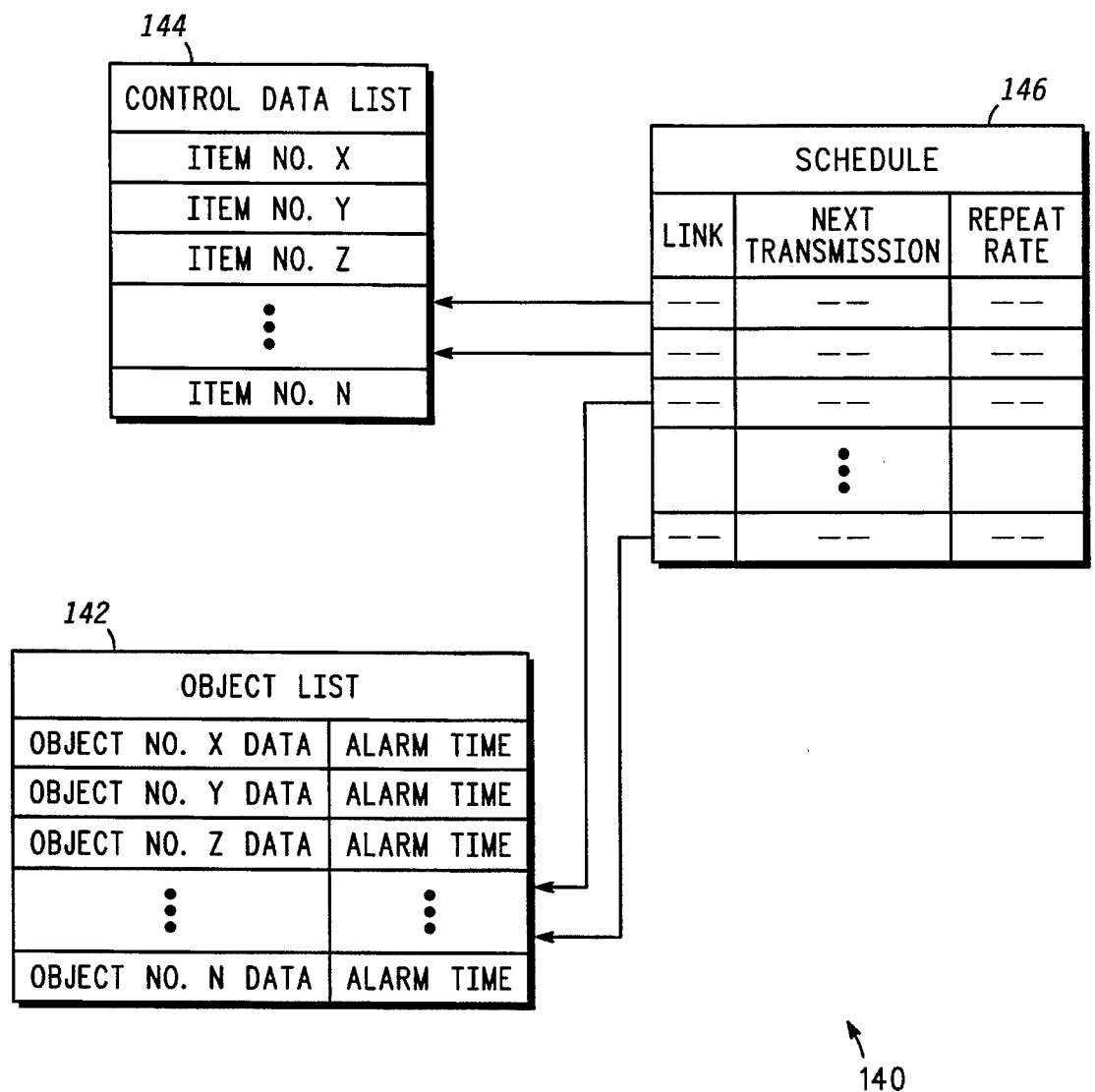
FIG. 13 is a block diagram of an exemplary memory structure maintained at the ground control station.

Referring to FIG. 13, memory structure 140 includes object list 142, control data list 144 and schedule 146. Object list 142 includes a list of equipped aircraft 12 and unequipped aircraft 14 being tracked by ground control station 18 at any given time. For the purposes of FIG. 13, aircraft 12, 14 are referred to as objects. Object list 142 includes a record for each object in the list. Object list 142 is established and maintained in a manner that is discussed below. Each record includes the object's location data in association with an alarm time. Location data generally include data conveyed in location data communication 84 (FIG. 5) and may include additional data.

The alarm time indicates a point in time at which the object's record may be purged from object list 142. Generally speaking, objects should be purged when the aircraft they represent leave airspace 10. The aircraft's departure from airspace 10 may be identified by a lack of new location data describing the aircraft. Consequently, alarm times are set to expire, in a manner discussed below, when no location data are received for a predetermined duration.

Control data list 144 includes a record for each control data communication 100 and/or 116 (FIGS. 6, 7). The record generally includes the data to be included in control data communications 100 and/or 116. Control data list 144 is established and maintained using conventional database management techniques well known to those skilled in the art.

Schedule 146 includes a list of records which determines when to broadcast data communications 20 from ground control station 18 over network 22. For control data communications 100 and 116, these records are established and maintained using conventional database management techniques. For location data communications 84, these records are established and maintained in a manner discussed below.

Each record in schedule 146 includes a link identifying the particular data communication 20, whether location data communication 84 or control data communications 100 and/or 116, to which the record relates. In addition, each record in schedule 146 includes timing data identifying a point in time when a particular data communication 20 should next be transmitted over network 22 and data which indicate a rate at which data communication 20 should repeat. For control data communications 100 and/or 116, a human operator of ground control station 18 may specify the repetition rate through conventional database management techniques. For location data communications 84, the repetition rate may, for example, be set equal to once per frame 76 (FIG. 4) or any other suitable value.

Referring to FIGS. 8 and 13, task 138 consults schedule 146 to determine the earliest next transmission time listed in schedule 146. Once this next transmission time has been identified, the corresponding data communication 20 is queued for transmission over network 22 by placing the data communication 20 in an appropriate buffer and setting a timer of controller 32 (FIG. 2) to expire at the indicated time. Of course, task 138 may desirably wait to queue the data communication 20 until any previously queued data communication 20 has completed its transmission. Once data communication 20 is queued, ground control station 18 will automatically transmit the data communication 20 through radio 40 when its next transmission time occurs.

After task 138, task 148 examines the repeat rate data in schedule 146 to determine which future frame 76 (FIG. 4) wherein just-queued data communication 20 should be repeated. After task 148, task 150 performs a random number generation process to determine a randomized next transmission time within timing window 78 of frame 76 identified in task 148. Next, task 152 updates schedule 146 by writing the next transmission time for corresponding data communication 20. After task 152, program control loops back to task 138. Those skilled in the art will appreciate that the continuous repetition of transmissions of data communications 20 keeps the data conveyed by the data communications 20 current. In other words, each item of data conveyed by data communications 20 is described in a stream of data communications 20 that track any changes in the data. Each data communication 20 for a particular item of data is delayed from a previous data communication 20 for that item of data by a randomized interval.

Figure 10:
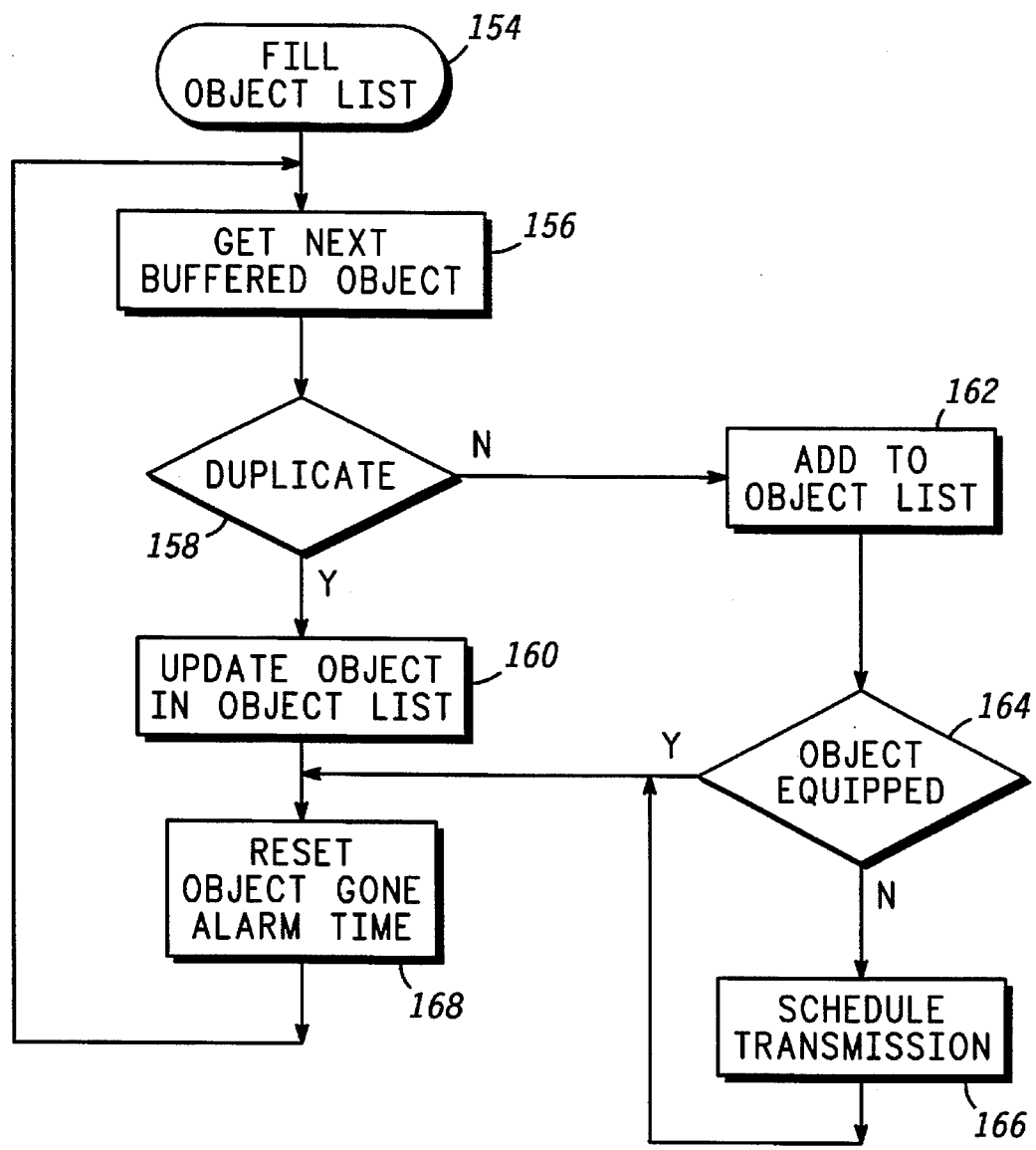
FIG. 10 is a flow chart of a fill object list process.

FIG. 10 is a flow chart of fill object list process 154, which manages records included in object list 142 (FIG. 13) so that object list 142 includes only current, valid objects. Process 154 performs task 156 to get the next object available in the buffer discussed above in connection with receive process 130 (FIG. 8). This object may be either data communication 20 received from network 22 or a location data record received from radar system 16 (FIGS. 1–2).

After task 156, a query task 158 determines whether this object duplicates an object already present in object list 142. If the object has an aircraft ID associated with it, then this ID may serve to indicate whether it is a duplicate of an existing object. If this object has no aircraft ID, then task 158 may use predetermined proximity rules, perhaps coupled with any heading and/or speed data previously associated with the object in list 142, to determine whether this object is the same as another object currently in object list 142. If task 158 determines that this object duplicates an existing object, task 160 updates the object's record in object list 142. By updating the object's record, a new altitude, new location, new radio communication frequency or the like may be recorded. If new location data do not already include navigation data, such as heading and ground speed, task 160 may also calculate such navigation data based upon old location data, new location data and the intervening duration between old and new location data.

If task 158 determines that the object does not duplicate an existing object in object list 142, task 162 adds the object to object list 142. In other words, a new record is formed in object list 142 to describe the object currently being processed by process 154. After task 162, a query task 164 determines whether this object describes equipped aircraft 12 or unequipped aircraft 14 (FIG. 1). The object's record in object list 142 may desirably include a status field that is initially reset and later set only if data communication 20 regarding the object is received from equipped aircraft 12 over network 22. If the object's status field is reset, no communication regarding the object has been received from network 22 and the object may be assumed to be from unequipped aircraft 14. If the object's status field is set, then data communication 20 concerning the object has been received from network 22, and the object represents one of equipped aircraft 12.

When task 164 determines that the object represents one of unequipped aircraft 14, task 166 schedules the transmission of a surrogate location data communication 84 for the object. Task 166 adds a record to schedule 146 (FIG. 13) and links this record to the object just added to object list 142. Task 166 additionally sets the repeat rate for the unequipped aircraft's surrogate location data communications 84 (FIG. 5) and determines an upcoming time at which the first transmission should occur. The unequipped aircraft's surrogate location data communications 84 will then be broadcast over network 22 as discussed above in connection with process 136.

When task 164 determines that the object being examined by process 154 represents one of equipped aircraft 12, after completion of task 160, or after completion of task 166, program control proceeds to task 168. Task 168 resets the object's alarm time in object list 142. This alarm is set to expire at the end of a predetermined duration, e.g., 10–15 seconds. If the object's record is not updated in that period of time it will be removed from object list 142 in a manner discussed below. However, if new location data are received for the object within that period of time, process 154 and task 168 will again reset the alarm time to a new value, and the object's record will remain in object list 142. After task 168, program control loops back to task 156 to obtain the next object received at ground control station 18.

FIG. 11 is a flow chart of display process 170, which causes an image to be formed on display terminal 56 (FIG. 2). In particular, process 170 performs task 172 to display the objects in object list 142 (FIG. 13). As discussed above, object list 142 describes current locations and conditions for aircraft 12, 14 in airspace 10. Task 172 formats these data in a manner convenient for effective visual presentation at display 56 and causes display 56 to display a corresponding image. The images displayed through the performance of task 172 may, for example, resemble conventional air traffic control display images. Process 170 repeatedly performs task 172 so that the displayed images remain current and continuously track aircraft 12, 14 along with object list 142.

FIG. 12 is a flow chart of maintain object list process 174, which maintains object list 142 (FIG. 13) so that it remains in a current, valid state. Process 174 performs task 176 that identifies a next object from object list 142. Next, a query task 178 examines the alarm time data associated with the object's record in object list 142. As discussed above, an expired alarm indicates that no new location data for the identified object have been received for a predetermined duration. This situation occurs when aircraft 12, 14 move out of radar or radio range. If the alarm has not yet expired, no action is taken and program control loops back to task 176 to identify the next object. If the alarm has expired, task 180 removes the object from object list 142. Task 180 may rewrite the object's record to some other location to preserve a record of the aircraft's presence in airspace 10 (FIG. 1), or task 180 may simply erase the object's record. After task 180, program control loops back to task 176 to examine the next object's alarm time.

FIGS. 14–18 are flow charts of exemplary processes performed by aircraft station 24. Preferably, all aircraft stations 24 in airspace 10 perform similar processes. In the embodiment illustrated by FIGS. 14–18, aircraft station 24 performs several different processes concurrently. Each of these processes may operate in a continuous loop or in some other manner which permits them to remain indefinitely operative or at least to operate when needed so long as station 24 is energized.

FIG. 14 is a flow chart of receive process 182, which performs task 184 to obtain data communication 20 from network 22. As discussed above, data communications 20 are received over network 22 from any ground station 18 or other equipped aircraft 12 within radio range of aircraft station 24. As soon as aircraft station 24 receives data communication 20 through radio 68 (FIG. 3), task 184 places data communication 20 in a buffer in memory 60. Task 184 then repeats, either in a continuous loop as shown in FIG. 14 or as needed when additional data communications 20 are received.

FIG. 15 is a flow chart of transmit process 186, which controls transmission of data communications 20 over network 22 from aircraft station 24. Process 186 performs task 188 to get and save data to be included in the next transmitted data communication 20. While nothing prevents aircraft stations 24 from transmitting control data communications, aircraft stations 24 may primarily transmit location data communications 84 (FIG. 5) over network 22. Thus, task 188 gets location data and other data to be included in an upcoming location data communication 84. The location data may be obtained from location determination system 64 (FIG. 3), and voice communication channel frequency identities may be obtained from radio 66. Heading, ground speed, and other navigational data may be obtained by processing changes that take place in location data over time.

After task 188, task 190 queues next location data communication 84. A point in time at which next location data communication 84 should take place has already been calculated in process 186. Thus, task 190 performs substantially the same function as task 138 (FIG. 9). Data to be conveyed by next location data communication 84 were obtained above in task 188. When the indicated time arrives, radio 68 automatically transmits location data communication 84.

After task 190, task 192 randomizes the next transmission time. In other words, task 192 performs a random number generation process to identify a specific time within window 78 (FIG. 4) of next frame 76 at which next location data communication 84 should take place. After task 192, task 194 causes program control to wait for a period of time, then loop back to task 188. The period of time for which program control waits at task 194 is determined so that task 188 will be performed just in time to meet timing constraints imposed by the transmission time for next location data communication 84, causing location data communications 84 to convey data which are as current as possible.

Of course, those skilled in the art will appreciate that aircraft station 24 may perform other tasks while waiting during task 194. Such other tasks may include the processing of location and other data. For example, current location data may be processed with past location data to determine heading, ground speed, altitude change rates and the like for equipped aircraft 12.

Figure 16:
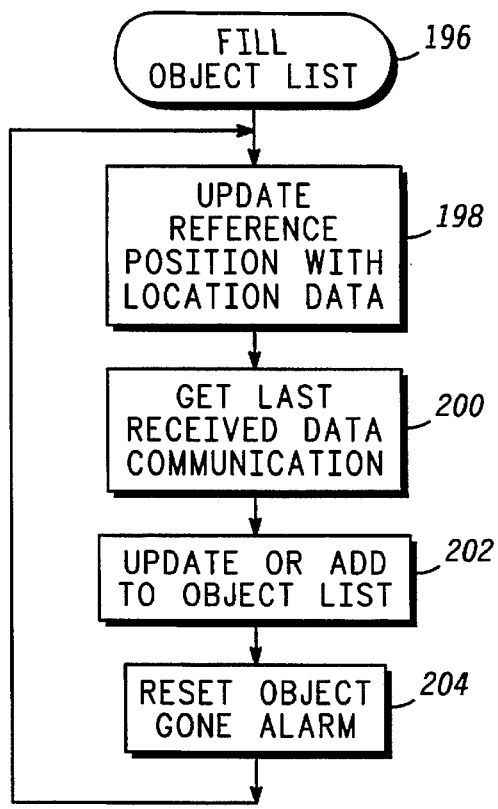
FIG. 16 is a flow chart of a fill object process.

FIG. 16 is a flow chart of fill object process 196, which manages records included in an object list maintained in memory 60 (FIG. 3) of aircraft station 24. The aircraft station's object list (not shown) may be similar to object list 142 (FIG. 13). Process 196 performs task 198 to update the "reference" position with location data. The reference position is the geographic position of equipped aircraft 12 within which aircraft station 24 is installed. This position may be obtained from location determination system 64 or from memory 60 after being saved therein through task 188 (FIG. 15).

After task 198, task 200 gets any received data communication 20 saved in a buffer through the performance of task 184 (FIG. 14). Next, task 202 updates or adds this received data communication to the object list maintained in memory 60. As discussed above in connection with process 154 (FIG. 10), this object list is added to when received data communication 20 do not duplicate objects currently listed therein and is updated when the data communication 20 is a duplicate. After task 202, task 204 updates an object gone alarm associated with the object in the object list. As discussed above in connection with object list 142 (FIG. 13), this alarm is used to determine when objects in the object list have gone stale and should be removed. After task 204, program control loops back to task 198.

Figure 17:
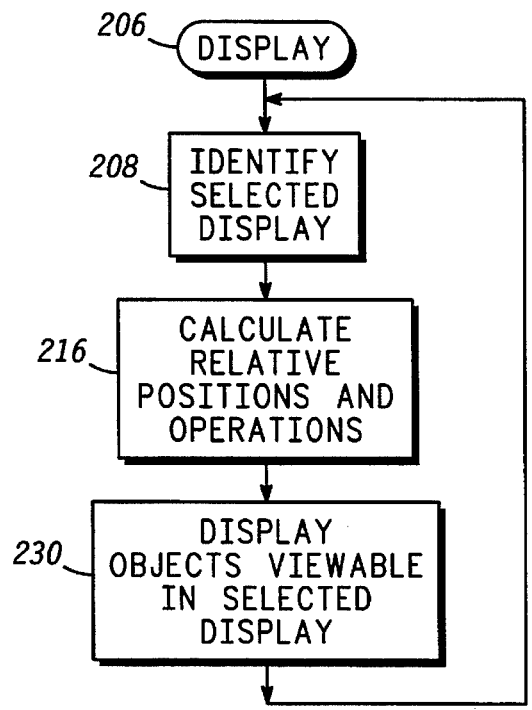
FIG. 17 is a flow chart of a display process.

FIG. 17 is a flow chart of display process 206, which controls presentation of graphic images on video display terminal 62 (FIG. 3). Process 206 performs task 208 to identify a display screen that is currently selected for display. The pilot selects a display screen through input device 70.

Figure 19:
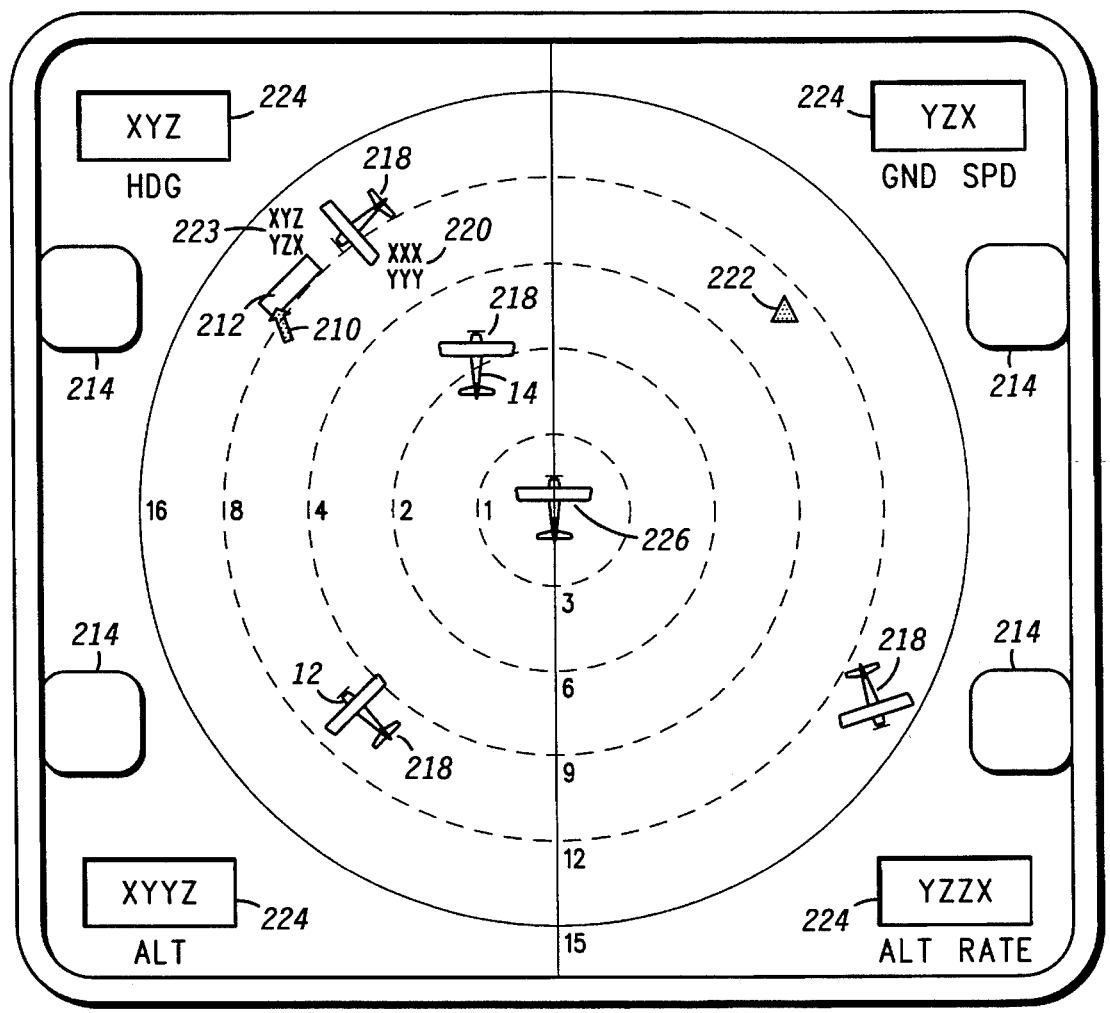
FIG. 19 depicts an example of a first display formed by the aircraft station.
Figure 20:
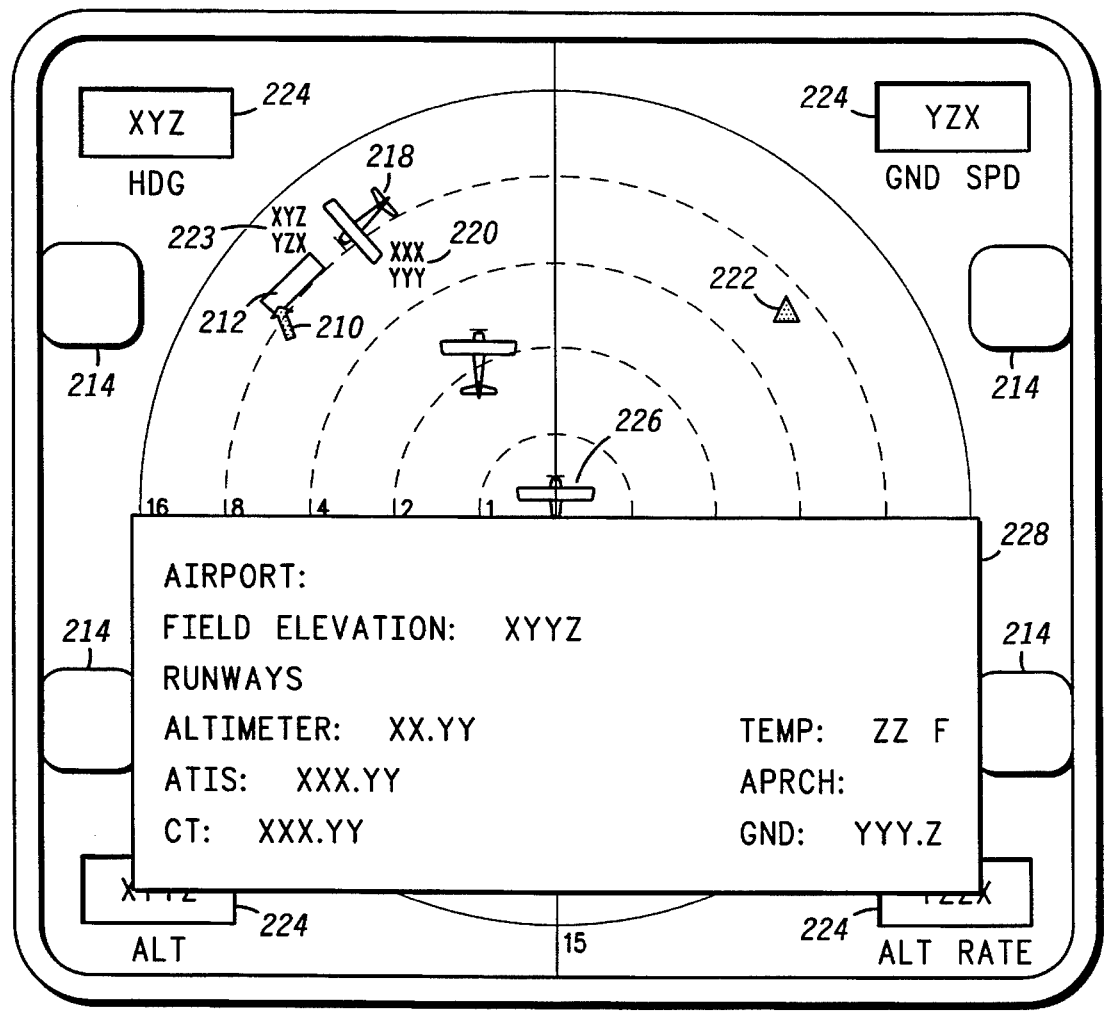
FIG. 20 depicts an example of a second display formed by the aircraft station.

FIGS. 19–20 show examples of two different display screens that are selectable by the pilot. Referring to FIG. 19, conventional pointing device techniques may be used to move a pointer 210 to a displayed object and select a screen associated with the object. FIG. 19 illustrates pointer 210 pointing at a runway's graphic icon 212. By selecting the indicated object, a new screen, such as the one shown in FIG. 20 may be displayed to present information relating to the selected object. In addition, selection button icons 214 may be selected to cause still other screens to be displayed.

Referring to FIG. 17, after task 208 identifies the screen to be displayed, task 216 determines the graphic objects and other items to be displayed and performs any calculations needed to determine the relative positions and orientations of the graphic objects to be displayed. Task 216 may also associate predetermined icons with some of the various types of data to be displayed.

As shown in FIGS. 19–20, graphic aircraft icons 218 may be used to indicate data obtained from location data communications 84 (FIG. 5) received at aircraft station 24. The location and orientation may reflect location and heading data conveyed by received location data communications 84. Both equipped aircraft 12 and unequipped aircraft 14 are displayed. Textual data 220 convey other information that might have been conveyed by received location data communications 84. This other information may include altitude, aircraft ID, voice communication frequencies, and the like. Other icons, such as runway icon 212 and an obstruction icon 222 may be used to indicate the geographic features described in data received from control data communications 116. Textual data 223 convey data received through control data communications 100 (FIG. 6) and/or 116 (FIG. 7) relating to geographic features. Such textual data may, for example, indicate approach and tower frequencies used at particular airports. Textual windows 224 may be provided to indicate navigational parameters for the equipped aircraft 12 within which aircraft station 24 is installed. Such navigational parameters may include current heading, ground speed, altitude and altitude rate of change.

Preferably, task 216 (FIG. 17) determines positions for icons 218, 212, 222 and the like relative to reference position 226, which is the current position for equipped aircraft 12 within which aircraft station 24 is installed. Aircraft icon 218 may also be used to indicate reference position and current heading. Relative distances between reference position 226 and other objects may be displayed on a linear scale, as indicated by the numerals 3, 6, 9, 12 and 15 (vertically arranged coordinates indicating km in FIG. 19) or on a non-linear scale, as indicated by the numerals 1, 2, 4, 8 and 16 (horizontally arranged coordinates indicating km). Those skilled in the art will appreciate that any single display would probably not indicate both scales and inclusion of both in FIG. 19 is for purposes of illustration and does not indicate that both scales are operative simultaneously, i.e., FIG. 19 does not imply that 1 km on the horizontal scale is related to 3 km on the vertical scale. The non-linear scale may be advantageous because it allows greater detail to be shown near aircraft 12, the vicinity of greatest interest to pilots in collision avoidance.

With reference to FIG. 20, when a display that relates to a particular airport has been selected, window 228 may pop up over the display of FIG. 19 to present textual data related to the selected airport. These data have been received through control data communications 100 (FIG. 6) and/or 116 (FIG. 7). Such data may include, for example, airport name, runway designations and status, weather conditions, voice communication frequencies and the like.

Referring to FIG. 17, after task 216 calculates the relative positions and orientations of the icons, windows, and the like, to be displayed at terminal 62 (FIG. 3), task 230 displays the objects viewable in the selected display. After task 230, program control loops back to task 208 to repeat the process so that the display tracks current conditions and changes in screen selection.

Figure 18:
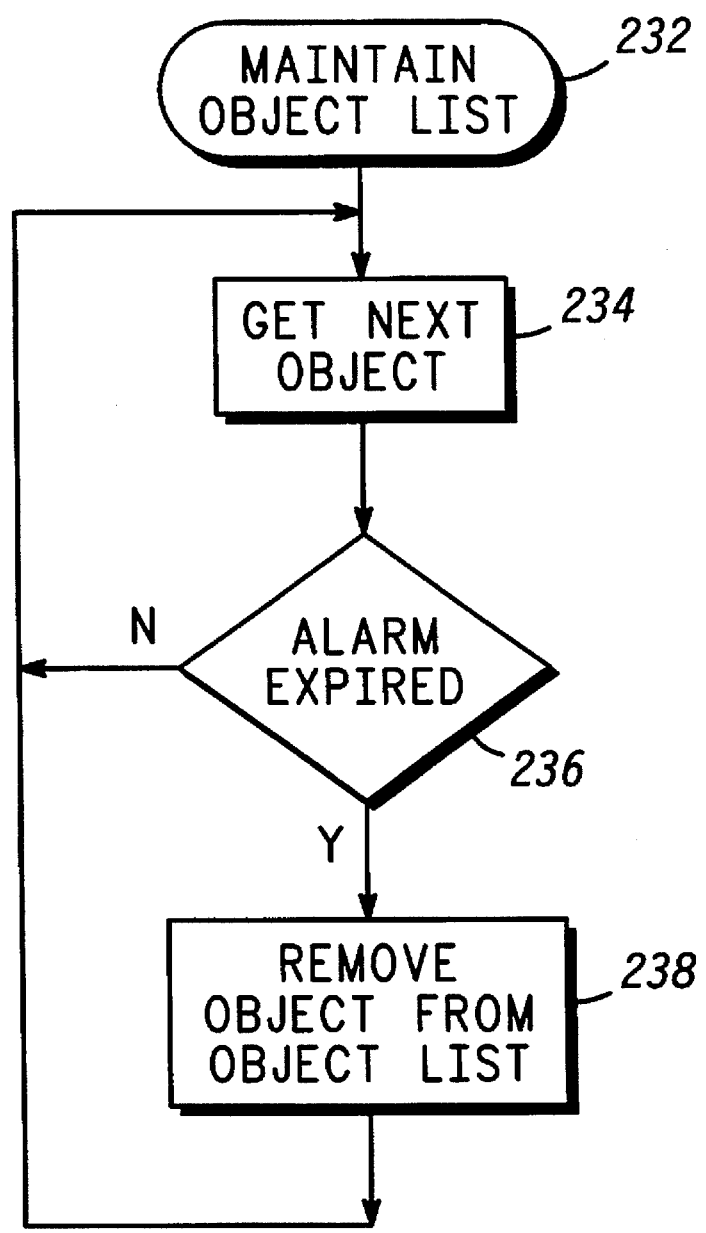
FIG. 18 is a flow chart of a maintain object list process.

FIG. 18 is a flow chart of maintain object list process 232, which maintains the object list for aircraft station 24 so that the object list remains in a current, valid state. Process 232 operates substantially as described for process 174 (FIG. 12). Task 234 selects the next object to be examined from an object list similar to object list 142 (FIG. 13). Query task 236 examines alarm times associated with objects in the object list. An expired alarm indicates that no location data for the identified object has been received for an extended period of time. This situation occurs when equipped aircraft 12 and ground control stations 18 move out of radio range of aircraft station 24. If the alarm has not yet expired, no action is taken. If the alarm has expired, the associated object is removed from the object list in task 238.

In summary, the present invention provides an improved collision avoidance and communication system along with an improved method for communicating useful pilot information and for avoiding collisions. The present invention simplifies rather than complicates an aircraft cockpit. Aircraft operations such as communication, navigation and collision avoidance are integrated together. Although an aircraft station is added to the avionics on an aircraft, other avionics, such as navigation equipment, may then be omitted. A large portion of communication functions are currently carried out through verbal conversations. In contrast, the present system and method convey considerable routine aviation information through data communications. This aviation information is kept current through repeating the communications at selected intervals, and this aviation information is displayed visually on a cockpit display. This routine information is less likely to be misunderstood and mistakes are correspondingly reduced. Moreover, the voice communication channels are freed for use in communicating other information and pilots need not continually experience a flood of such verbal communication. Collision avoidance data are also displayed on the cockpit display, and the same display indicates navigation data, such as heading, ground speed and the like.

The collision avoidance data give pilots information regarding locations of nearby aircraft. Thus, pilots, who are ultimately responsible for the safe operation of their aircraft, can have more control over collision avoidance decisions.

The collision avoidance system and method of the present invention may be implemented gradually throughout the aviation industry. This collision avoidance system instantly benefits equipped aircraft even though a substantial portion of the population of aircraft are not equipped. The benefit occurs because ground control stations detect locations for unequipped aircraft and transmit surrogate location data communications to inform equipped aircraft of unequipped aircrafts' locations. Thus, equipped aircraft have a sufficient amount of information upon which to base collision avoidance decisions. As more and more aircraft become equipped, fewer and fewer surrogate location data communications are broadcast from ground control stations. Even if substantially all aircraft become equipped, existing radar systems may be utilized to provide a backup mechanism which can compensate for individual equipment failures.

The present invention has been described above with reference to preferred embodiments. However, those skilled in the art will recognize that changes and modifications may be made in these preferred embodiments without departing from the scope of the present invention. For example, others may devise alternate processes to accomplish substantially the same functions as those described herein. Memory structures other than those depicted herein may by employed. These and other changes and modifications which are obvious to those skilled in the art are intended to be included within the scope of the present invention.

What is claimed is:

1. In a system having a plurality of equipped and unequipped aircraft at various locations and having a control station, each aircraft of said equipped set of nearby aircraft including an aircraft station comprising a controller, an input device and video display for allowing an aircraft crew member to interact with said controller, a location determination system coupled to said controller and a radio for communicating over a common communication channel, said radio coupled to said controller, a method of managing information useful for safely operating said aircraft, said method comprising steps of:

obtaining, at a first aircraft, first data describing locations of an equipped set of nearby aircraft, said first data being obtained from said equipped set of nearby aircraft;

obtaining, at said first aircraft, second data describing locations of an unequipped set of nearby aircraft, said second data being obtained from said control station; and displaying, using different symbols for equipped and unequipped aircraft, said first and second location data on said video display at said first aircraft.

2. A method as claimed in claim 1 wherein said displaying step comprises a step of graphically indicating a location for said first aircraft relative to said locations for said equipped and unequipped sets of aircraft.

3. A method as claimed in claim 2 wherein said graphically indicating step controls a display to present icons corresponding to said first aircraft and to said equipped and unequipped aircraft, said icons being spaced apart on said video display in accordance with a non-linear scale so that geographic distance per unit of display distance is greater further away from said first aircraft.

4. A method as claimed in claim 1 wherein said obtaining first data step comprises steps of:

transmitting via said radio, from each aircraft in said equipped set of aircraft, a data communication, said data communications occurring over said common communication channel at diverse times; and receiving via said radio said data communications at said first aircraft.

5. A method as claimed in claim 4 wherein said data communications transmitted from said equipped set of aircraft are first data communications, said method additionally comprising steps of:

transmitting via said radio a second data communication from said first aircraft, said second data communication conveying data describing a location for said first aircraft, and said second data communication occurring over said common communication channel; and receiving said first and second data communications at said control station.

6. A method as claimed in claim 4 additionally comprising a step of selecting random points in time at which said data communications occur.

7. A method as claimed in claim 1 wherein:

said obtaining first data step comprises steps of:

transmitting via said radio, from each aircraft in said equipped set of aircraft, a first data communication, said first data communications occurring over said common communication channel at diverse times, and receiving via said radio said first data communications at said first aircraft; and said obtaining second data step comprises steps of:

transmitting, from said control station, a second data communication to convey said second data for one or more of said aircraft in said unequipped set of aircraft, said second data communication occurring over said common communication channel, and receiving via said radio said second data communication at said first aircraft.

8. A method as claimed in claim 7 additionally comprising steps of:

operating a radar system to obtain said second data; and communicating said second data from said radar system to said control station.

9. A method as claimed in claim 7 wherein said first and second data communications convey information at a maximum data rate, said method additionally comprising steps of:

spreading said first and second data communications over a frequency spectrum broader than said maximum data rate; and correlating signals received at said first aircraft using a predetermined spreading code to detect said first and second data communications.

10. A method as claimed in claim 7 additionally comprising a step of repeating said obtaining first data and obtaining second data steps to keep information conveyed in said first and second data communications current at said first aircraft.

11. A method as claimed in claim 1 additionally comprising steps of:

obtaining, at said first aircraft, control data from said control station, said control data including data identifying a voice communication radio channel used in association with said control station; and displaying said control data via said video display at said first aircraft.

12. A method as claimed in claim 1 additionally comprising steps of:

obtaining, at said first aircraft, control data from said control station, said control data including data describing weather conditions; and displaying, via said video display, said control data at said first aircraft.

13. A method as claimed in claim 1 additionally comprising steps of:
   obtaining, at said first aircraft, control data from said control station, said control data including data describing locations of geographic features; and
   displaying, via said video display, said control data at said first aircraft.

14. A method as claimed in claim 1 additionally comprising steps of:
   determining, at each aircraft in said equipped set of aircraft, a location for said each aircraft;
   determining a location for said first aircraft at said first aircraft; and
   transmitting via said radio, from said first aircraft, third data describing said location of said first aircraft.

15. A method as claimed in claim 14 wherein said transmitting third data step comprises a step of transmitting control data from said first aircraft via said radio, said control data identifying a radio channel to which a voice communication radio in said first aircraft is tuned.

16. A system for managing information useful in safely operating a population of aircraft including an equipped set of aircraft and an unequipped set of aircraft, each aircraft of said equipped set of nearby aircraft including an aircraft station comprising a controller, an input device and video display for allowing an aircraft crew member to interact with said controller, a location determination system coupled to said controller and a radio for communication over a common communication channel, said radio coupled to said controller, said system comprising:
   a radar subsystem configured to determine locations for substantially all aircraft of said population of aircraft; and
   a control station in data communication with said radar subsystem, said control station being configured to transmit, over a common channel, data describing locations for said unequipped set of aircraft wherein each aircraft station is configured to determine a location for its aircraft, to transmit data describing locations for its aircraft, to detect location data transmitted from other aircraft stations and said control station, and to display, using different symbols for equipped and unequipped aircraft said location data determined by said control station and said aircraft station.

17. A system for managing information as claimed in claim 16 wherein:
   said control station is configured to transmit control data describing weather conditions over said common channel; and
   each aircraft station is configured to display said control data.

18. A system for managing information as claimed in claim 16 wherein:
   said control station is additionally configured to transmit control data identifying a radio channel being used for voice communications over said common channel; and
   each aircraft station is additionally configured to display said control data.

19. A system for managing information as claimed in claim 16 wherein:
   said control station is additionally configured to transmit, over said common channel, control data describing geographic features; and
   each aircraft station is additionally configured to display said control data.

20. A system for managing information as claimed in claim 16 wherein each aircraft station is configured to transmit said data describing locations for its aircraft in a stream of data communications, wherein each of said data communications is delayed from a previous one of said data communications by a randomized interval.

21. A system for managing information as claimed in claim 16 wherein:
   each aircraft station includes a spread spectrum radio for transmitting said data describing locations for its aircraft and for detecting said location data transmitted from other aircraft stations and said control station; and
   said control station includes a spread spectrum radio for transmitting said data describing locations of said unequipped set of aircraft.

22. A system for managing information as claimed in claim 16 wherein:
   said control station is further configured to detect said location data transmitted from a portion of said aircraft stations;
   each aircraft station includes an aircraft radio and said control station includes a control radio; and
   said aircraft and control radios are mutually configured so that communications between aircraft radios may be detected within a first range and so that communications between an aircraft and said control radio may be detected within a second range, said second range being greater than said first range.

23. A method for managing information useful in safely operating a population of aircraft which includes an equipped set of aircraft and an unequipped set of aircraft, each aircraft of said equipped set of nearby aircraft including an aircraft station comprising a controller, an input device and video display for allowing and aircraft crew member to interact with said controller, a location determination system coupled to said controller and a radio for communicating over a common communication channel, said radio coupled to said controller, said method comprising steps of:
   operating a radar system to determine locations for substantially all aircraft of said population of aircraft;
   transmitting, from a control station and in response to said operating step, data describing locations for said unequipped set of aircraft; and
   at each aircraft from said equipped set of aircraft:
   identifying a location for said equipped aircraft,
   transmitting data describing said location determined in said identifying step,
   detecting location data transmitted from other aircraft from said equipped set of aircraft and from said control station, and
   displaying, using different symbols for equipped and unequipped aircraft said location data from said detecting step.

24. A method as claimed in claim 23 wherein said control station is a location data source and each of said aircraft from said equipped set of aircraft are location data sources and wherein data describing locations are transmitted from each location data source as a stream of data communications, wherein each of said data communications is delayed from a previous one of said data communications transmitted at the same location data source by a randomized interval.

25. A method as claimed in claim 23 additionally comprising steps of:
   transmitting control data describing weather conditions from said control station; and at each aircraft from said equipped set of aircraft:

detecting said control data, and displaying said control data.

26. A method as claimed in claim 23 additionally comprising steps of:

transmitting control data identifying a radio channel being used for voice communications from said control station; and at each aircraft from said equipped set of aircraft:

detecting said control data, and displaying said control data.

27. A method as claimed in claim 23 additionally comprising steps of:

transmitting control data describing geographic features from said control station; and at each aircraft from said equipped set of aircraft:

detecting said control data, and displaying said control data.

28. A method as claimed in claim 23 additionally comprising a step of detecting, at said control station, location data transmitted by said aircraft from said equipped set of aircraft.

29. A method as claimed in claim 23 additionally comprising steps of:

at each aircraft from said equipped set of aircraft, transmitting control data identifying a voice channel being used at said aircraft; and detecting said control data at said control station.

* * * * *